United States Patent
Han et al.

(10) Patent No.: US 11,078,917 B2
(45) Date of Patent: Aug. 3, 2021

(54) AIR COOLING APPARATUS HAVING AN EXPANDER DRIVEN BY A POWER TRANSMISSION USING A ROTATING MAGNETIC FIELD

(71) Applicants: Seungjoo Han, Busan (KR); Byungho Han, Busan (KR); Jongtaek Han, Busan (KR)

(72) Inventors: Seungjoo Han, Busan (KR); Byungho Han, Busan (KR); Jongtaek Han, Busan (KR)

( * ) Notice: Subject to any disclaimer, the term of this patent is extended or adjusted under 35 U.S.C. 154(b) by 410 days.

(21) Appl. No.: 15/773,259

(22) PCT Filed: Nov. 4, 2016

(86) PCT No.: PCT/KR2016/012686
§ 371 (c)(1),
(2) Date: May 3, 2018

(87) PCT Pub. No.: WO2017/082595
PCT Pub. Date: May 18, 2017

(65) Prior Publication Data
US 2018/0320696 A1    Nov. 8, 2018

(30) Foreign Application Priority Data
Nov. 9, 2015   (KR) .................. 10-2015-0157002

(51) Int. Cl.
*F04D 25/02* (2006.01)
*H02K 7/14* (2006.01)
(Continued)

(52) U.S. Cl.
CPC ........... *F04D 25/026* (2013.01); *F04D 25/06* (2013.01); *F04D 25/08* (2013.01); *F04D 29/056* (2013.01);
(Continued)

(58) Field of Classification Search
CPC ...... F04D 25/026; F04D 29/58; F04D 25/022; F04D 25/0633; F04D 29/04;
(Continued)

(56) References Cited

U.S. PATENT DOCUMENTS 3,643,120 A * 2/1972 Young .................. H02K 7/11
310/96
4,065,234 A * 12/1977 Yoshiyuki ............ H02K 49/108
417/420

(Continued)

FOREIGN PATENT DOCUMENTS

| JP | 2001-078378 A | 3/2001 |
| JP | 2001-234897 A | 8/2001 |

(Continued)

*Primary Examiner* — Bryan M Lettman
*Assistant Examiner* — Timothy P Solak
(74) *Attorney, Agent, or Firm* — Patent Office of Dr. Chung Park

(57) ABSTRACT

Air cooling devices driven by rotational power of an electric motor to expand air to thereby produce and supply cooling air. The air cooling device includes a power transmission device for increasing a rotational driving force of an expander that is disposed between an expander housing and the electric motor and for separating the expander from the electric motor. The power transmission device generates rotational magnetic field by receiving rotational power from the electric motor or receiving rotational power from the electric motor and external electric power. The rotating magnetic field generates a rotational force by interacting with magnetic field, based on attraction and repulsion forces. The air cooling device increases rotation speed and force when it transmits the power. The air cooling device increases a flow rate, and expands air adiabatically, thereby supplying cold air with high air density.

8 Claims, 12 Drawing Sheets

(51) Int. Cl.
*H02K 1/27* (2006.01)
*H02K 49/10* (2006.01)
*H02K 9/06* (2006.01)
*F04D 25/06* (2006.01)
*F04D 25/08* (2006.01)
*F04D 29/056* (2006.01)
*F04D 29/58* (2006.01)
*H02K 5/16* (2006.01)
*H02K 7/18* (2006.01)
*H02K 5/20* (2006.01)

(52) U.S. Cl.
CPC .............. *F04D 29/58* (2013.01); *H02K 1/27* (2013.01); *H02K 5/163* (2013.01); *H02K 7/14* (2013.01); *H02K 7/1823* (2013.01); *H02K 9/06* (2013.01); *H02K 49/108* (2013.01); *H02K 5/20* (2013.01)

(58) Field of Classification Search
CPC .......... F04B 2203/0203; H02K 49/108; H02K 16/025; H02K 7/11
USPC ........................................................ 417/420
See application file for complete search history.

(56) References Cited

U.S. PATENT DOCUMENTS

| | | | | |
|---|---|---|---|---|
| 5,690,519 | A | * | 11/1997 | Chen ...................... B63H 23/22 417/420 |
| 7,057,320 | B2 | * | 6/2006 | Abordi ................... H02K 1/278 310/103 |
| 10,323,567 | B2 | * | 6/2019 | Han ....................... F04D 29/284 |
| 2004/0118656 | A1 | * | 6/2004 | Inoue ..................... F04D 25/026 192/84.31 |
| 2011/0037333 | A1 | * | 2/2011 | Atallah .................. H02K 51/00 310/98 |
| 2013/0127279 | A1 | * | 5/2013 | Jang ........................ H02K 53/00 310/152 |

FOREIGN PATENT DOCUMENTS

| | | | |
|---|---|---|---|
| JP | 2008-062209 A | | 3/2008 |
| KR | 10-2009-0126459 A | | 12/2009 |
| KR | 10-1429846 B1 | | 8/2014 |
| WO | WO2014123361 | * | 8/2014 .............. F02B 33/34 |

* cited by examiner

AIR COOLING APPARATUS HAVING AN EXPANDER DRIVEN BY A POWER TRANSMISSION USING A ROTATING MAGNETIC FIELD

CROSS-REFERENCE TO PRIOR APPLICATIONS

This application is a national Stage Patent Application of PCT International Patent Application No. PCT/KR2016/012686, filed on Nov. 4, 2016 under 35 U.S.C. § 371, which claims priority of Korean Patent Application No. 10-2015-0157002, filed on Nov. 9, 2015, which are all hereby incorporated by reference in their entirety.

BACKGROUND OF THE INVENTION

Field of the Invention

The present invention relates to an air cooling apparatus which is driven by a rotation power of an electric motor to expand air and thus produce and supply cooling air.

Related Art

An air cooler is an air cooling device that blows cooled air and lowers the temperature using an evaporation cooling effect. The air cooler is equipped with a pinwheel on the rotation shaft of the motor and a water tank filled with water and ice in front of the pinwheel. In this case, when the pinwheel moves the surrounding air, the ice water in the water tank evaporates while absorbing surrounding heat. However, it is limited to lower the temperature to a certain temperature only by the air movement and the evaporation effect of water, and it is inconvenient to fill or replenish water and ice. Also, the feeling effect is reduced in a hot place where the humidity is high and the temperature is more than a certain level.

A mobile air conditioner is a cooling device that compresses a refrigerant with a compressor and blows cold air from the evaporator through condensation, expansion and evaporation processes with a blower. Compared with a fan or an air cooler, the mobile air conditioner has a better air cooling effect, but is high in the manufacturing cost. Also, indoors, it is difficult to block heat and condensate water coming from a condenser, and power consumption is high, resulting in considerable operation cost.

SUMMARY OF THE INVENTION

The present invention provides an air cooling apparatus driven by a rotation power of an electric motor to expand air and thus produce and supply cooling air, which increases the flow rate and adiabatically expands air to supply cold air having a high air density, by including a power transmission device increasing rotation driving of an expander between the expander and the electric motor, isolating the connection of the expander and the electric motor, and generating a rotation force with an interaction of magnetic fields generated by receiving the rotation power of the electric motor by the power transmission device to increase the revolution per minute and the rotation force and transmit power.

The present invention also provides an air cooling apparatus, which increases the flow rate and adiabatically expands air to supply cold air having a high air density, by including a power transmission device increasing rotation driving of an expander between the expander and an electric motor, isolating the connection of the expander and the electric motor, and generating a rotation force with an interaction of magnetic fields generated by receiving the external power and the rotation power of the electric motor by the power transmission device to increase the revolution per minute and the rotation force and transmit power.

The present invention also provides an air cooling apparatus, which increases the flow rate and adiabatically expands air to supply cold air having a high air density and reduces the operation cost using produced power for driving of the electric motor, by including a power transmission device increasing rotation driving of an expander between the expander and an electric motor, isolating the connection of the expander and the electric motor, and generating a rotation force with an interaction of magnetic fields generated by receiving the rotation power of the electric motor by the power transmission device to increase the revolution per minute and the rotation force, transmit power and simultaneously produce electric power.

In an aspect, there is an air cooling apparatus including: an electric motor; an expander rotating by rotation power of the electric motor to expand air; an expander housing surrounding the expander; and a power transmission device interposed between the electric motor and the expander housing to increase rotational driving of the expander, wherein the power transmission device includes a power generator driven by a magnetic field and a front driver module and a rear driver module disposed at the front and rear sides of the power generator to form a magnetic field around a front rotor and a rear rotor of the power generator, the power generator being mounted with the expander on a shaft of a bearing module, being mounted with the rear driver module and the expander housing spaced apart from the rear rotor by a predetermined gap in an axial direction of a frame and disposed in a direction orthogonal to the rear rotor at the rear side of the frame, the front side of the frame being mounted on the electric motor, and the front driver module being spaced from the front rotor by a predetermined gap in the axial direction of the frame and disposed in a direction orthogonal to the front rotor at the front side of the frame and being mounted on a shaft of the electric motor to receive rotation power of the electric motor, and the front rotor and the rear rotor of the power generator face the front driver module and the rear driver module, permanent magnets of the front rotor and the rear rotor having magnetic fluxes thereof facing the axial direction of the shaft, the permanent magnets of the front driver module and the rear driver module having magnetic fluxes thereof facing the axial diameter direction of the shaft such that a rotating magnetic field generated by rotation of the front driver module, a rotating magnetic field generated by the power generator and a magnetic field of the rear driver module form a rotational force with the interaction of an attractive force and a repulsive force to increase the revolution per minute and the rotational force and transfer power.

The power generator may include: a frame; the bearing module mounted on the frame and supporting the rotation; the front rotor and the rear rotor disposed in a direction orthogonal to the front and rear faces of the frame, spaced from the front and rear faces in an axial direction by a predetermined gap, fixed to the shaft of the bearing module, allowing the permanent magnets to be arranged in an axial diameter direction while being spaced by a predetermined gap in an axial direction of the shaft and disposed in an orthogonal direction such that the direction of the magnetic flux faces the axial direction of the shaft; driver modules spaced from the front rotor and the rear rotor by a predetermined gap in an axial direction of the shaft and disposed in an orthogonal direction such that permanent magnets are arranged around the front rotor and the rear rotor in an axial diameter direction and the direction of the magnetic flux faces the axial diameter direction of the shaft, and mounted onto the frame; lock nuts for fixing the front rotor and the rear rotor to the bearing module; and a fixture for fixing the bearing module to the frame.

The frame may have 2n (n is an integer of 4 or more) or 3n (n is an integer of 2 or more) permanent magnet-embedded holes formed in inner surfaces of the front and rear side in the circumferential axial direction around the front rotor and the rear rotor at a uniform interval based on a reference point centering on the axis of the body formed into a cylindrical shape, may have a mounting space and a cooling space of the bearing module formed of any one of a grease lubrication type bearing, an oil lubrication type bearing, an air cooling type bearing and a magnetic bearing formed in the inner circumferential surface of the frame, and may have mounting surfaces of the electric motor, the expander housing and the rear driver module formed at the front surface and the rear surface of the body thereof.

The bearing module may include: a shaft having a bearing mounting surface, a bearing fixing step, and fixing grooves and threads for fixing the phases of the front and rear rotors formed on a circumferential surface of a body having a round rod shape; any one of a grease lubrication type bearing, an oil lubrication type bearing, an air cooling type bearing and a magnetic bearing; and a fixture for fixing the phases of the front rotor and the rear rotor.

The front rotor and the rear rotor may include: a rotating plate including a cylindrical protrusion formed at the center of a body having a disc shape, having a slot groove formed in the inner circumferential surface to fix the phase, and having 2n (hereinafter, n is an integer of 2 or more) permanent magnet-embedded holes formed on a circumferential axis line of the body at a uniform interval in accordance with the slot groove; and 2n permanent magnets whose N poles and S poles are alternately embedded in the permanent magnet-embedded holes in accordance with the slot groove of the rotating plate such that the direction of the magnetic fluxes of 2n permanent magnets faces the axial direction of the shaft.

The driver module may include 2n (n is an integer of 4 or more) permanent magnets whose N poles and S poles are alternately embedded in the permanent magnet-embedded holes of the frame in accordance with the reference point of the frame or 3n (n is an integer of 2 or more) permanent magnets arranged in three-phase such that the direction of the magnetic fluxes of permanent magnets faces the axial diameter direction of the shaft.

The front driver module may include: a fixing body having a shaft through hole and a mounting surface of the electric motor formed at the center of a cylindrical body with one side thereof closed and having 2n (n is an integer of 4 or more) or 3n (n is an integer of 2 or more) permanent magnet-embedded holes formed in the circumferential axial direction around the front rotor at a uniform interval in accordance with a reference point; and 2n permanent magnets whose N poles and S poles are alternately embedded in the permanent magnet-embedded holes in accordance with the reference point of the fixing body or 3n permanent magnets arranged in three-phase such that the direction of the magnetic fluxes of 2n or 3n permanent magnets faces the axial diameter direction of the shaft.

The rear driver module may include: a fixing body having a mounting surface with the expander housing and the power generator and a through hole formed at a cylindrical body with one side thereof closed and having 2n (n is an integer of 4 or more) or 3n (n is an integer of 2 or more) permanent magnet-embedded holes formed in the circumferential axial direction around the rear rotor at a uniform interval in accordance with a reference point; and 2n permanent magnets whose N poles and S poles are alternately embedded in the permanent magnet-embedded holes in accordance with the reference point of the fixing body or 3n magnets arranged in three-phase such that the direction of magnetic fluxes of 2n or 3n permanent magnets faces the axial diameter direction of the shaft.

In the power transmission device, the permanent magnets of the front rotor and the rear rotor of the power generator may be arranged such that the direction of the magnetic flux faces the axial diameter direction of the shaft and the magnetic fluxes of the permanent magnets of the driver modules, the front driver module and the rear driver module of the power generator face the axial direction of the shaft.

The power transmission device may include a rear driver module including stators of coil assembly wound with a coil forming a magnetic flux in a direction orthogonal to the magnetic flux direction of the permanent magnets of the rear rotor to receive rotation power and external power of the electric motor, and the front rotor and the rear rotor of the power generator may face the front driver module and the rear driver module, the permanent magnets of the front rotor and the rear rotor having magnetic fluxes facing the axial direction of the shaft, the permanent magnets of the front driver module and the stators of the rear driver module having magnetic fluxes facing the axial diameter direction of the shaft such that the rotating magnetic field generated by rotation of the front driver module, the rotating magnetic field generated by the power generator and the magnetic field of the rear driver module form a rotational force with the interaction of an attractive force and a repulsive force to increase the revolution per minute and the rotational force and transfer power.

The rear driver module may include: a fixing body having a mounting surface with the expander housing and the power generator and a through hole formed at a cylindrical body with one side thereof closed and having 2n (n is an integer of 4 or more) or 3n (n is an integer of 2 or more) stator-embedded holes formed in the circumferential axial direction and the circumferential axial diameter direction around the rear rotor at a uniform interval in accordance with a reference point; and a stator of a coil assembly wound around a coil former whose N poles and S poles are alternately embedded in 2n stator-embedded holes in accordance with the reference point of the fixing body or embedded in 3n stator-embedded holes in three-phase such that the direction of magnetic fluxes of 2n or 3n stators faces the axial diameter direction of the shaft.

In the power transmission device, the permanent magnets of the front rotor and the rear rotor of the power generator may be arranged such that the direction of the magnetic flux faces the axial diameter direction of the shaft and the magnetic fluxes of the stators of the driver modules, the front driver module and the rear driver module of the power generator face the axial direction of the shaft.

The power transmission device may include a rear driver module including armatures of coil assembly wound with a coil forming a magnetic flux in the same direction as the magnetic flux direction of the permanent magnets of the rear rotor on the same circumferential axial line to receive rotation power of the electric motor, and the front rotor of the power generator may face the front driver module, the permanent magnets of the front rotor and the rear rotor having magnetic fluxes facing the axial direction of the shaft, the permanent magnets of the front driver module having magnetic fluxes facing the axial diameter direction of the shaft such that the rotating magnetic field generated by rotation of the front driver module and the rotating magnetic field generated by the power generator form a rotational force with the interaction of an attractive force and a repulsive force to increase the revolution per minute and the rotational force and the rear rotor transfers power of the rotating magnetic field to the rear driver module to intermit the magnetic flux and produce power.

The rear driver module may include: a fixing body having a mounting surface with the expander housing and the power generator and a through hole formed at a cylindrical body with one side thereof closed and having 3n (n is an integer of 2 or more) armature-embedded holes formed on the same circumferential axial line as the permanent magnet-embedded holes of the rear rotor at a uniform interval in accordance with a reference point; and an armature of a coil assembly wound around a coil former and embedded in 3n armature-embedded holes in three-phase in accordance with the reference point of the fixing body such that the direction of 3n magnetic fluxes faces the axial direction of the shaft.

As described above, according to an embodiment of the present invention, there is provided an air cooling apparatus which increases the flow rate and adiabatically expands air to supply cold air having a high air density, by including a power transmission device increasing rotation driving of an expander between the expander and the electric motor, isolating the connection of the expander and the electric motor, and generating a rotation force with an interaction of magnetic fields generated by receiving the rotation power of the electric motor by the power transmission device to increase the revolution per minute and the rotation force and transmit power.

Also, an air cooling apparatus, there is provided an air cooling apparatus which increases the flow rate and adiabatically expands air to supply cold air having a high air density, by including a power transmission device increasing rotation driving of an expander between the expander and an electric motor, isolating the connection of the expander and the electric motor, and generating a rotation force with an interaction of magnetic fields generated by receiving the external power and the rotation power of the electric motor by the power transmission device to increase the revolution per minute and the rotation force and transmit power.

In addition, there is provided an air cooling apparatus which increases the flow rate and adiabatically expands air to supply cold air having a high air density and reduces the operation cost using produced power for driving of the electric motor, by including a power transmission device increasing rotation driving of an expander between the expander and an electric motor, isolating the connection of the expander and the electric motor, and generating a rotation force with an interaction of magnetic fields generated by receiving the rotation power of the electric motor by the power transmission device to increase the revolution per minute and the rotation force, transmit power and simultaneously produce electric power.

DESCRIPTION OF EXEMPLARY EMBODIMENTS

Figure 1:
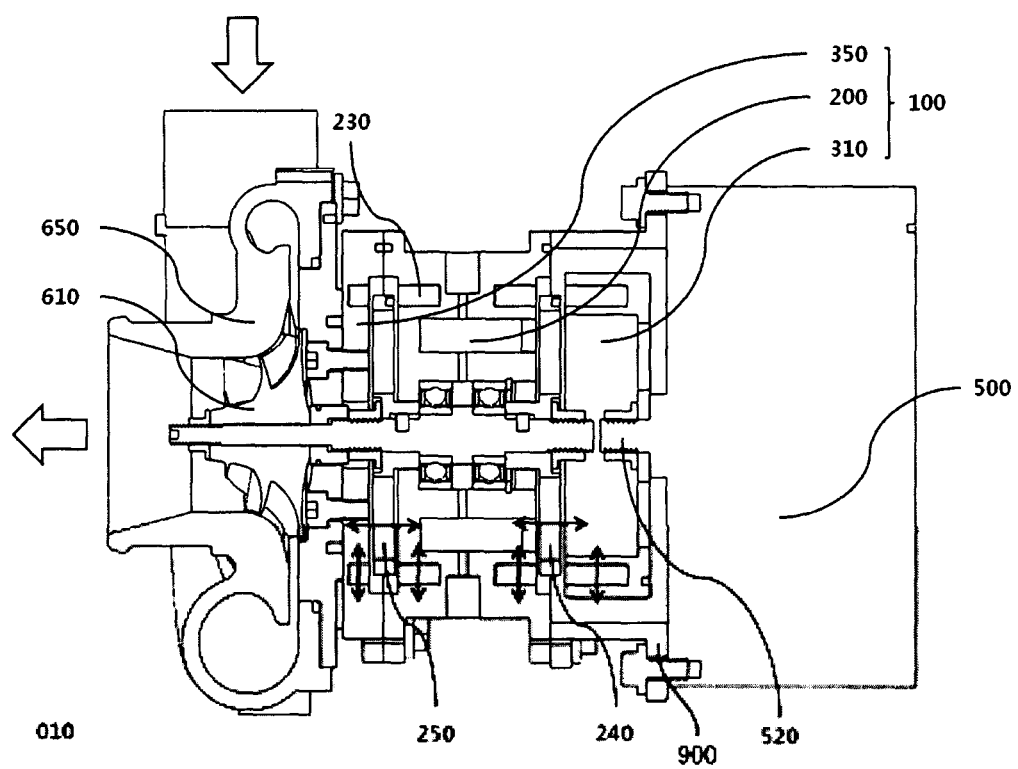
FIG. 1 is a cross-sectional perspective view illustrating an air cooling apparatus according to a first embodiment of the present invention.
Figure 2:
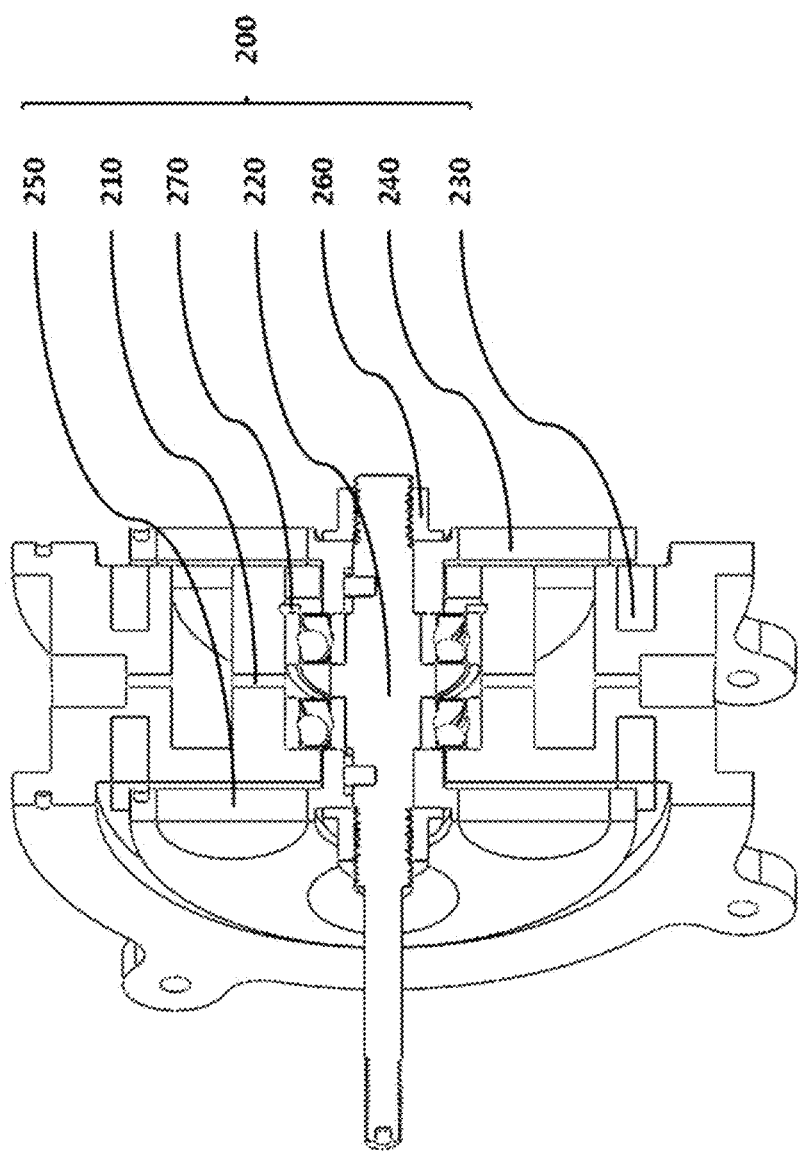
FIG. 2 is a cross-sectional perspective view illustrating a power generator.
Figure 8:
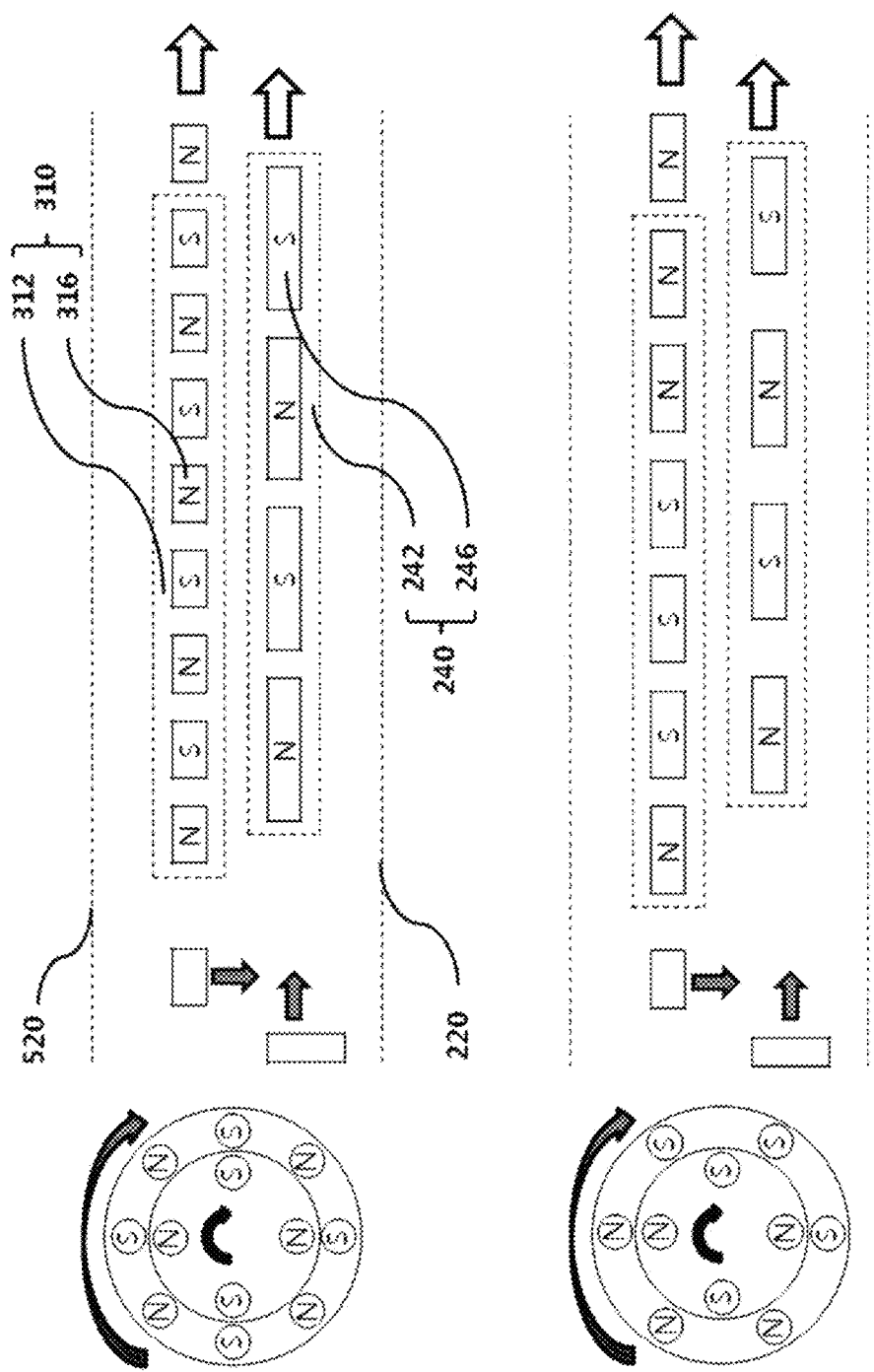
FIGS. 8 to 10 are views illustrating operations of a power transmission device according to an embodiment of the present invention.
Figure 9:
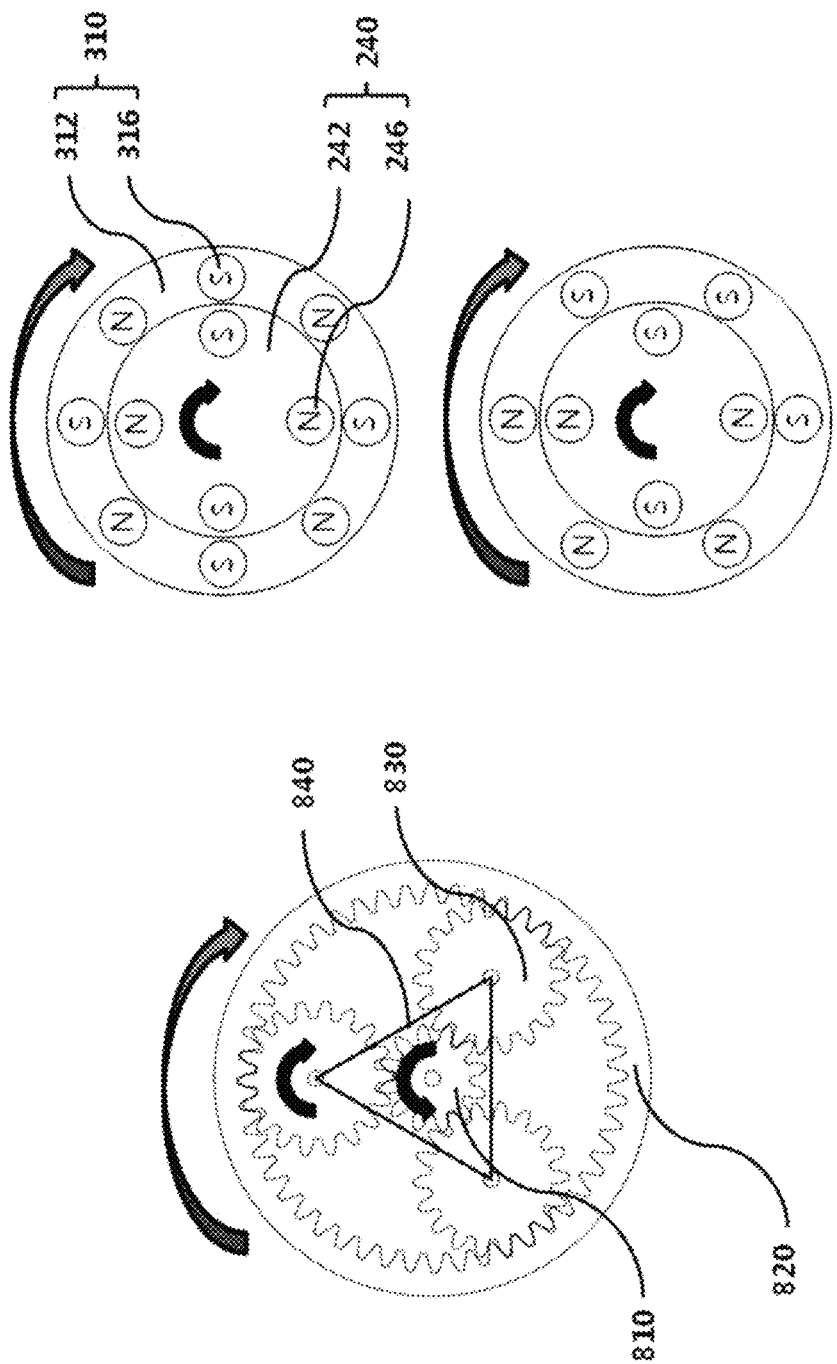
Figure 10:
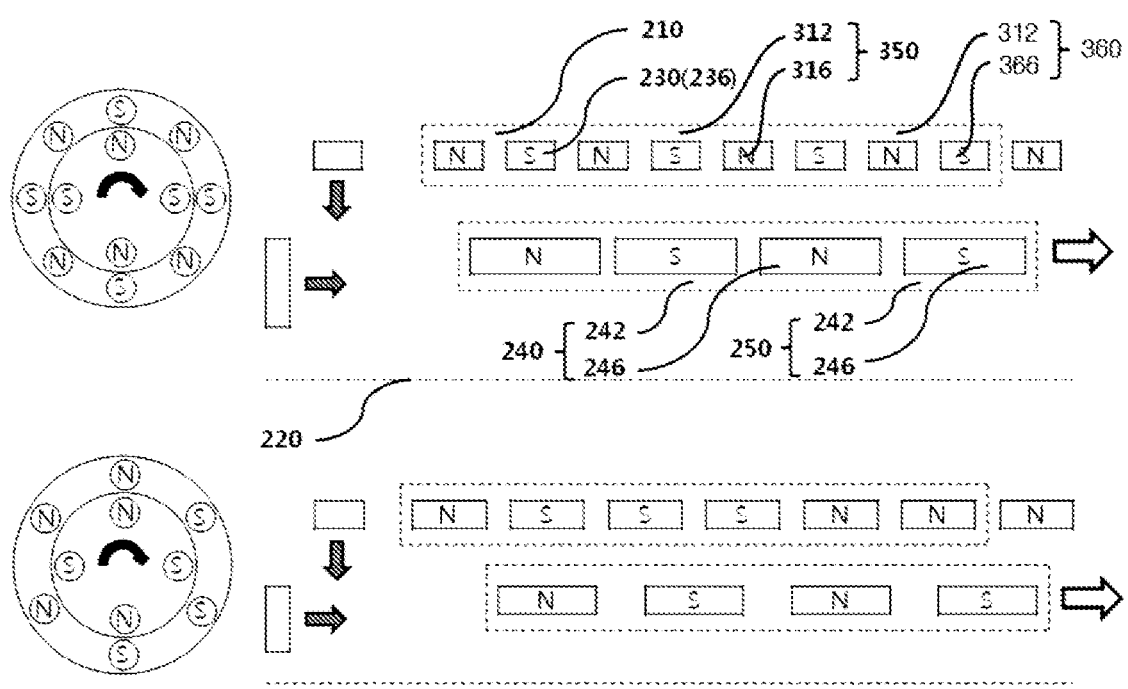

Hereinafter, embodiments of the present invention will be described in detail with reference to the accompanying drawings. In the drawings, the same reference numerals are given to the same parts, and redundant description will be omitted. The first embodiment will be described. FIG. 1 is a cross-sectional perspective view illustrating an air cooling apparatus 010 according to a first embodiment of the present invention, FIG. 2 is a cross-sectional perspective view of a power generator 200, FIGS. 3 to 7 are cross-sectional perspective views of the components, and FIGS. 8 to 10 illustrate operations of a power transmission device 100. First, the components will be described. The air cooling apparatus 010 according to an embodiment of the present invention includes an electric motor 500, an expander 610 rotating by the rotation of the electric motor 500 to expand air, and an expander housing 650 surrounding the expander 610, and a power transmission device 100 interposed between the electric motor 500 and the expander housing 650 to transmit the rotation power from the electric motor 500 to the expander 610.

The power transmission device 100 includes a power generator 200 driven by a magnetic field and a front driver module 310 and a rear driver module 350 disposed at the front and rear sides of the power generator 200 to form a magnetic field around a front rotor 240 and a rear rotor 250 of the power generator 200. The power generator 200 is mounted with the expander 610 on a shaft 221 of a bearing module 220, and is mounted with the rear driver module 350 and the expander housing 650 spaced apart from the rear rotor 250 by a predetermined gap in an axial direction of a frame 210 and disposed in a direction orthogonal to the rear rotor 250 at the rear side of the frame 210. The front side of the frame 210 is mounted on the electric motor 500, and the front driver module 310 is spaced from the front rotor 240 by a predetermined gap in the axial direction of the frame 210, disposed in a direction orthogonal to the front rotor 240 at the front side of the frame 210, and mounted on a shaft 520 of the electric motor 500.

As shown in FIGS. 1 and 2, the power generator 200 includes driver modules 230 including permanent magnets 236 whose magnetic flux direction faces the axial diameter direction of the bearing module 220 and mounted in permanent-embedded holes 213 formed at the front surface and the rear surface of the frame 210, and a bearing module 220 mounted in the frame 210 to support the rotation and fixed with a fixture 270 such as a snap ring or a lock nut. The front rotor 240 and the rear rotor 250 whose magnetic flux directions of the permanent magnets 246 face the axial direction of the bearing module 220 are mounted on the bearing module 220 and are fixed with a lock nut 260.

Specifically, the power generator 200 includes a frame 210, the bearing module 220 mounted on the frame 210 and supporting the rotation, the front rotor 240 and the rear rotor 250 disposed in a direction orthogonal to the front and rear faces of the frame 210, spaced from the front and rear faces in an axial direction by a predetermined gap, fixed to the shaft 221 of the bearing module 220, allowing the permanent magnets 246 to be arranged in an axial diameter direction while being spaced by a predetermined gap in an axial direction of the shaft 221 and disposed in an orthogonal direction such that the direction of the magnetic flux faces the axial direction of the shaft 221, driver modules 230 spaced from the front rotor 240 and the rear rotor 250 by a predetermined gap in an axial direction of the shaft 221 and disposed in an orthogonal direction such that permanent magnets 236 are arranged around the front rotor 240 and the rear rotor 250 in an axial diameter direction and the direction of the magnetic flux faces the axial diameter direction of the shaft 221, and mounted onto the frame 210, lock nuts 260 for fixing the front rotor 240 and the rear rotor 250 to the bearing module 220, and a fixture 270 for fixing the bearing module 220 to the frame 210.

Figure 3:
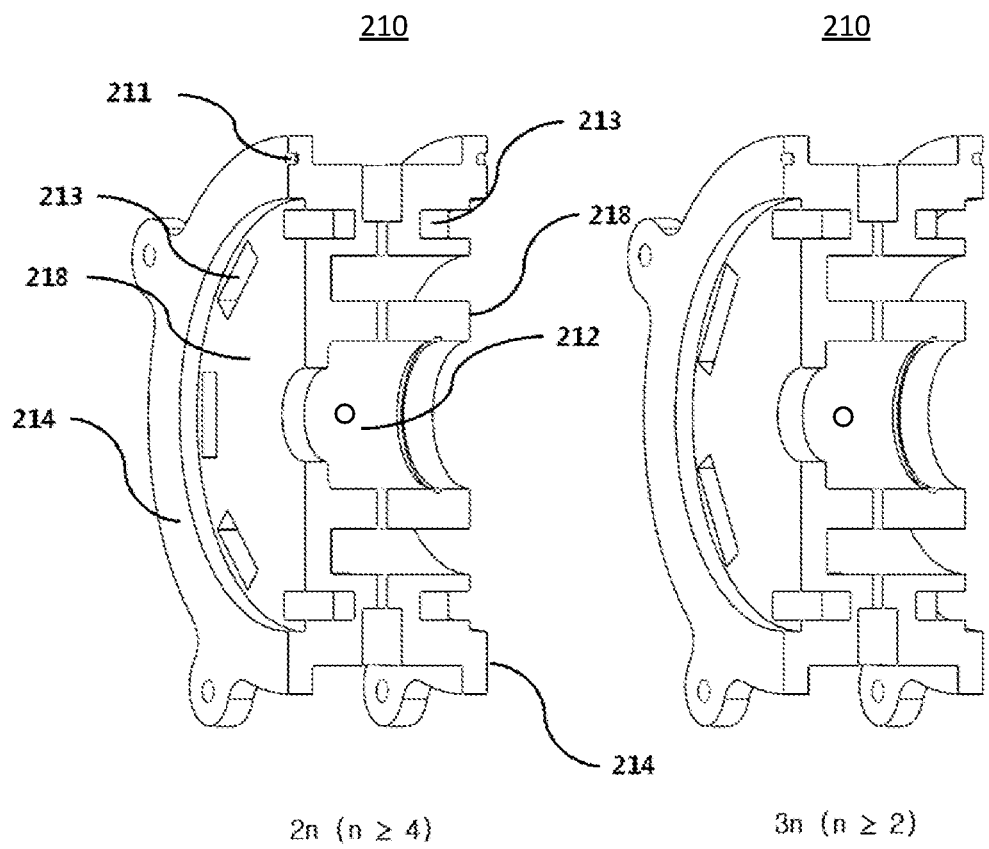
FIG. 3 is a cross-sectional perspective view illustrating a frame of the power generator.

As shown in FIG. 3, the frame 210 has permanent magnet-embedded holes 213 formed in inner surfaces 218 of the front and rear side in the circumferential axial direction around the front rotor 240 and the rear rotor 250 at a uniform interval based on a reference point 211 centering on the axis of the body formed into a cylindrical shape, has a mounting space of the bearing module 220 and a cooling space 212 formed in the inner circumferential surface of the frame 210, and has mounting surfaces 214 of the electric motor 500, the expander housing 650 and the rear driver module 350 formed at the front surface and the rear surface of the body thereof.

Specifically, the frame 210 has 2n (n is an integer of 4 or more) or 3n (n is an integer of 2 or more) permanent magnet-embedded holes 213 formed in inner surfaces 218 of the front and rear side in the circumferential axial direction around the front rotor 240 and the rear rotor 250 at a uniform interval based on a reference point 211 centering on the axis of the body formed into a cylindrical shape, has a mounting space and a cooling space 212 of the bearing module 220 formed of any one of a grease lubrication type bearing, an oil lubrication type bearing, an air cooling type bearing and a magnetic bearing formed in the inner circumferential surface of the frame 210, and has mounting surfaces of the electric motor 500, the expander housing 650 and the rear driver module 350 formed at the front surface and the rear surface of the body thereof.

Figure 4:
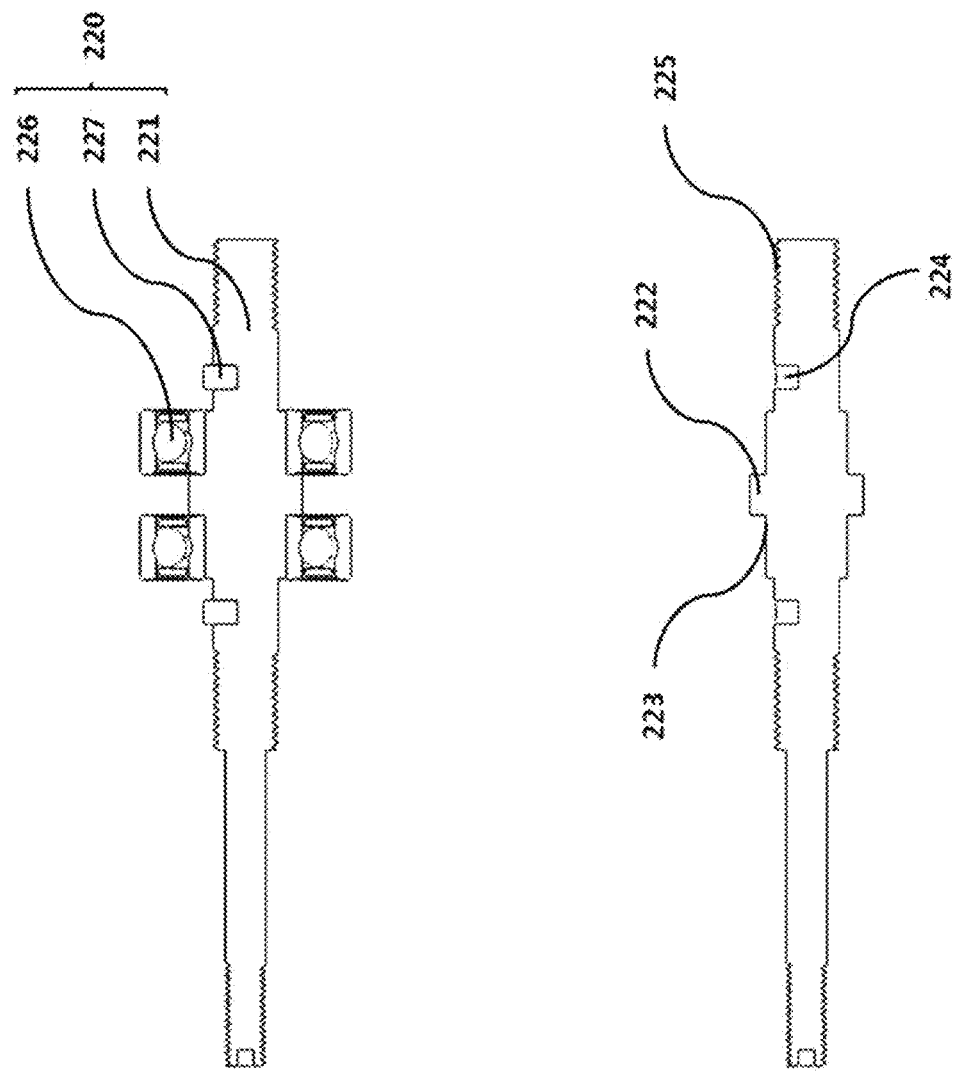
FIG. 4 is a cross-sectional perspective view illustrating a bearing module of the power generator.

As shown in FIG. 4, the bearing module 220 is mounted with a bearing supporting the rotation and disposed in a shaft 221 having a bearing mounting surface 223, a bearing fixing step 222, and fixing grooves 224 and threads 225 for fixing the phases of the front rotor 240 and the rear rotor 250 formed on a circumferential surface of a body having a round rod shape, and is mounted with a fixture 227 for fixing the phases of the front rotor 240 and the rear rotor 250. Also, any one 226 of a grease lubrication type bearing, an oil lubrication type bearing, an air cooling type bearing and a magnetic bearing, which does not exceed the permissible limit ensuring the durability life according to the maximum revolution per minute of the front rotor 240 and the rear rotor 250 may be applied to the bearing module 220.

Specifically, the bearing module 220 includes a shaft 221 having a bearing mounting surface 223, a bearing fixing step 222, and fixing grooves 224 and threads 225 for fixing the phases of the front rotor 240 and the rear rotor 250 formed on a circumferential surface of a body having a round rod shape, any one 226 of a grease lubrication type bearing, an oil lubrication type bearing, an air cooling type bearing and a magnetic bearing, and a fixture 227 for fixing the phases of the front rotor 240 and the rear rotor 250.

Figure 5:
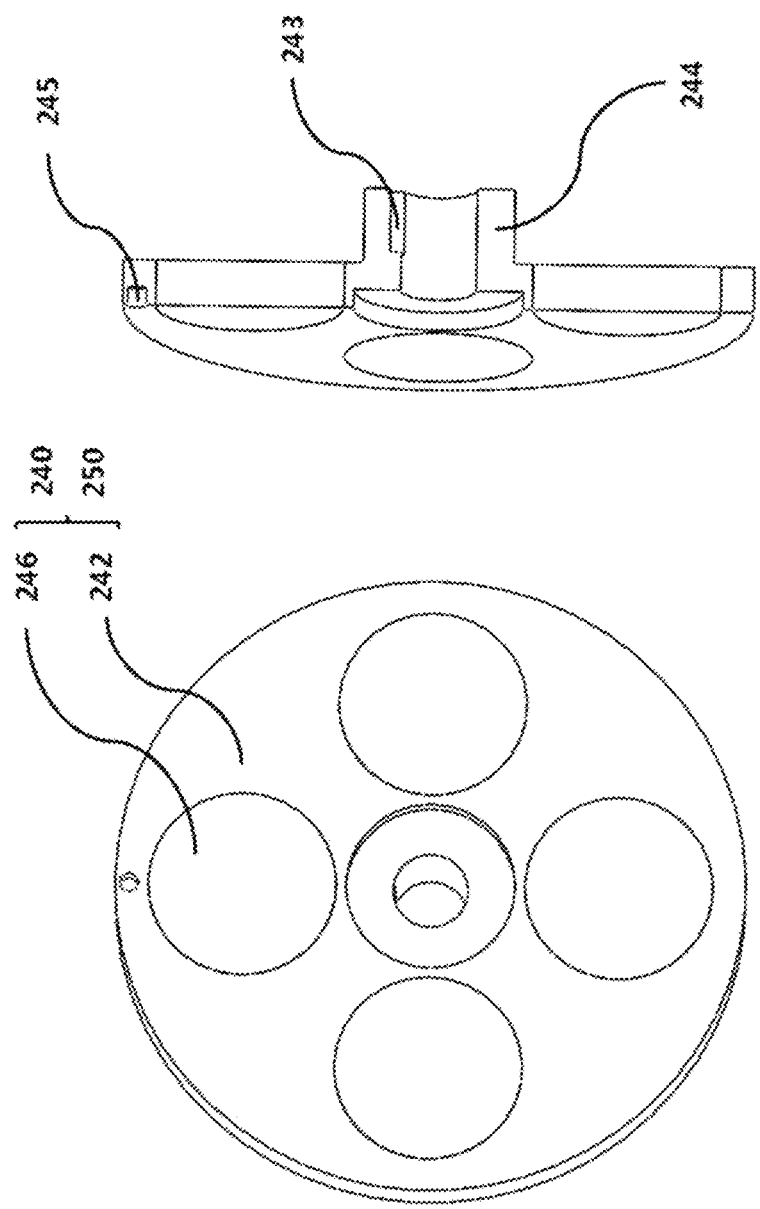
FIG. 5 is a cross-sectional perspective view illustrating a front rotor and a rear rotor of the power generator.

As shown in FIG. 5, in each of the front rotor 240 and the rear rotor 250, a rotating plate 242 including a cylindrical protrusion 244 formed at the center of a body having a disc shape, having a slot groove 243 formed in the inner circumferential surface to fix the phase, and having 2n (hereinafter, n is an integer of 2 or more) permanent magnet-embedded holes formed on a circumferential axis line of the body at a uniform interval in accordance with the slot groove 243 is provided. Also, 2n permanent magnets 246 whose magnetic flux direction faces the axial direction of the shaft 221 are arranged such that N poles and S poles of the permanent magnets 246 are alternately embedded in the permanent magnet-embedded holes of the rotating plate 242 in accordance with the slot groove of the rotating plate.

Specifically, each of the front rotor 240 and the rear rotor 250 includes a rotating plate 242 including a cylindrical protrusion 244 formed at the center of a body having a disc shape, having a slot groove 243 formed in the inner circumferential surface to fix the phase, and having 2n (hereinafter, n is an integer of 2 or more) permanent magnet-embedded holes formed on a circumferential axis line of the body at a uniform interval in accordance with the slot groove 243, and 2n permanent magnets 246 whose N poles and S poles are alternately embedded in the permanent magnet-embedded holes in accordance with the slot groove of the rotating plate 242 such that the direction of the magnetic fluxes of 2n permanent magnets 246 faces the axial direction of the shaft 221.

Figure 6:
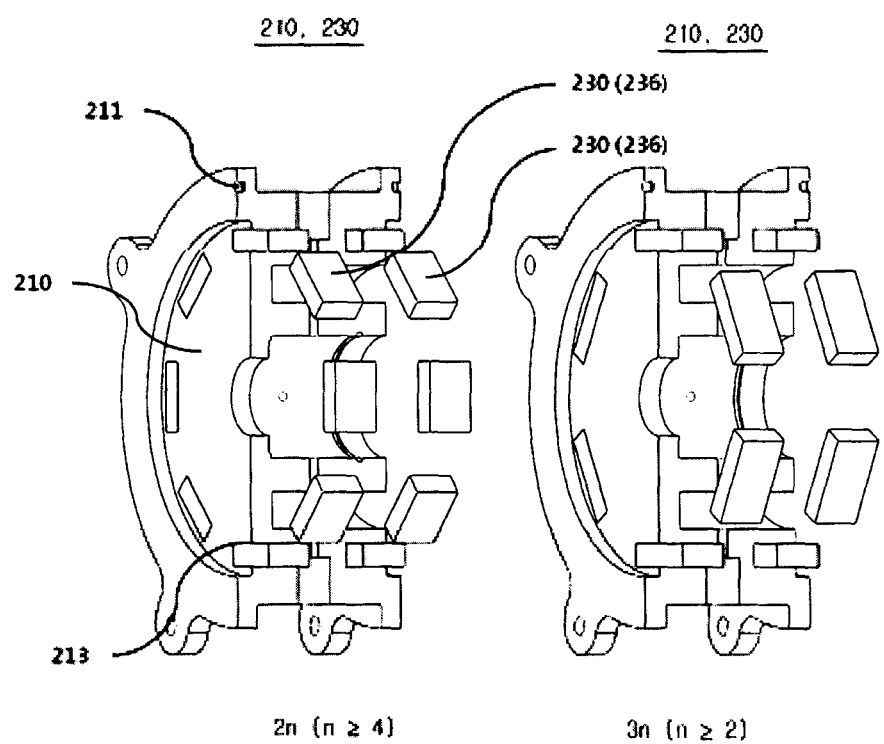
FIG. 6 is a perspective view illustrating a driver module of the power generator.

As shown in FIG. 6, in the driver module, 2n (n is an integer of 4 or more) permanent magnets whose magnetic flux direction faces the axial diameter direction of the shaft 221 are arranged such that N poles and S poles are alternately embedded in the permanent magnet-embedded holes 213 of the frame 210 in accordance with the reference point of the frame 210 or 3n (n is an integer of 2 or more) permanent magnets are arranged in three-phase.

Specifically, the driver module includes 2n (n is an integer of 4 or more) permanent magnets whose N poles and S poles are alternately embedded in the permanent magnet-embedded holes 213 of the frame 210 in accordance with the reference point of the frame 210 or 3n (n is an integer of 2 or more) permanent magnets arranged in three-phase such that the direction of the magnetic fluxes of permanent magnets faces the axial diameter direction of the shaft 221.

Figure 7:
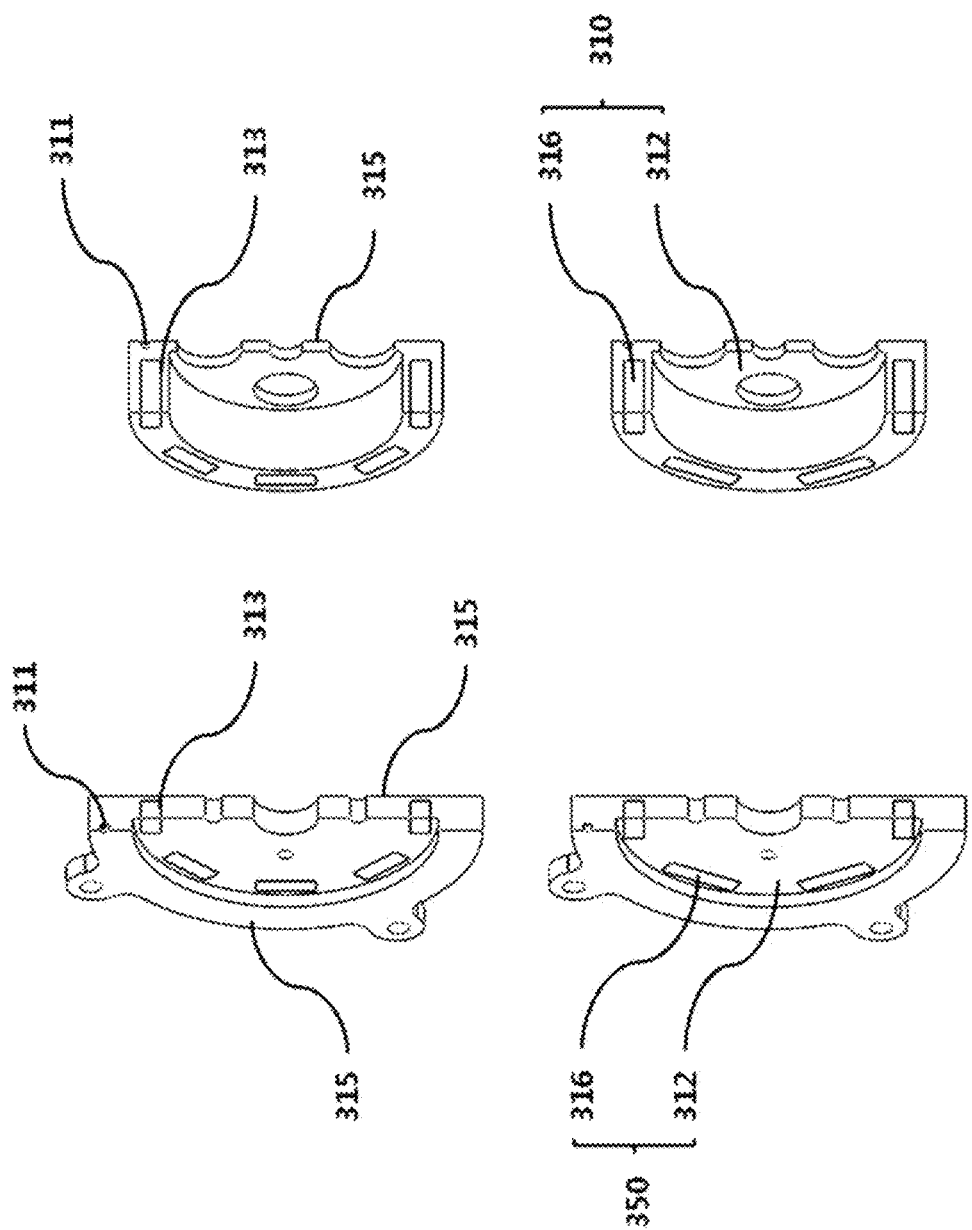
FIG. 7 is a cross-sectional perspective view illustrating a front driver module and a rear driver module.

As shown in FIG. 7, in the front driver module 310, a fixing body having a shaft 221 through hole and a mounting surface of the electric motor formed at the center of a cylindrical body with one side thereof closed and having 2n (n is an integer of 4 or more) or 3n (n is an integer of 2 or more) permanent magnet-embedded holes 313 formed in the circumferential axial direction around the front rotor 240 at a uniform interval in accordance with a reference point 311 is provided. Permanent magnets 316 whose magnetic flux direction faces the axial diameter direction of the shaft 221 are arranged such that N poles and S poles are alternately embedded in the permanent magnet-embedded holes 313 in accordance with the reference point 311 of the fixing body or permanent magnets 316 are arranged in three-phase.

Specifically, the front driver module includes a fixing body having a shaft 221 through hole and a mounting surface of the electric motor formed at the center of a cylindrical body with one side thereof closed and having 2n (n is an integer of 4 or more) or 3n (n is an integer of 2 or more) permanent magnet-embedded holes 213 formed in the circumferential axial direction around the front rotor 240 at a uniform interval in accordance with a reference point, and 2n permanent magnets whose N poles and S poles are alternately embedded in the permanent magnet-embedded holes 213 in accordance with the reference point of the fixing body or 3n permanent magnets arranged in three-phase such that the direction of the magnetic fluxes of 2n or 3n permanent magnets faces the axial diameter direction of the shaft 221.

As shown in FIG. 7, in the rear driver module 350, a fixing body 312 having a mounting surface 315 with the expander housing 650 and the power generator 200 and a through hole formed at a cylindrical body with one side thereof closed and having permanent magnet-embedded holes 313 formed in the circumferential axial direction around the rear rotor 250 at a uniform interval in accordance with a reference point 311 is provided, and permanent magnets 316 whose magnetic flux direction faces the axial diameter direction of the shaft 221 are arranged such that N poles and S poles are alternately embedded in the permanent magnet-embedded holes 313 in accordance with the reference point 311 of the fixing body 312 or permanent magnets 316 are arranged in three-phase.

Specifically, the rear driver module 350 includes a fixing body 312 having a mounting surface 315 with the expander housing 650 and the power generator 200 and a through hole formed at a cylindrical body with one side thereof closed and having 2n (n is an integer of 4 or more) or 3n (n is an integer of 2 or more) permanent magnet-embedded holes 313 formed in the circumferential axial direction around the rear rotor 250 at a uniform interval in accordance with a reference point 311, and 2n permanent magnets 316 whose N poles and S poles are alternately embedded in the permanent magnet-embedded holes 313 in accordance with the reference point of the fixing body or 3n permanent magnets arranged in three-phase such that the direction of magnetic fluxes of 2n or 3n permanent magnets 316 faces the axial diameter direction of the shaft 221.

In the power transmission device 100, the permanent magnets 246 of the front rotor 240 and the rear rotor 250 of the power generator 200 may be arranged such that the direction of the magnetic flux faces the axial diameter direction of the shaft 221 and the magnetic fluxes of the permanent magnets 236 and 316 of the driver modules 230, the front driver module 310 and the rear driver module 350 of the power generator 200 face the axial direction of the shaft 221.

The expander 610 has a through hole formed at the center of the cylindrical body, a circular plate on the outer circumferential surface at a rear side around the rotation axis, and wings radially formed on the outer circumferential surface of the body at a uniform interval. Thus, since the wings are curved in the rotation direction in the axial direction from the axial orthogonal radial direction of the circular plate, the expander 610 has a shape with a gradually narrower flow path. In addition, it is also possible to form a gradually narrower flow path in which the wings are curved toward the opposite direction of rotation.

The expander housing 650 includes an air inlet for guiding intake air to the expander 610, and an air outlet which increases the flow rate of air introduced in a radial direction into a snail shell-shaped scroll a nozzle space, gathers air at one place, introduces air into the expander 610, converts the pressure energy into velocity energy of air adiabatically expanded from the expander, and then discharges air.

Hereinafter, the operation of the air cooling apparatus 010 will be described. The air cooling apparatus 010 includes the electric motor 500 and the expander 610 disposed in an air passage of the expander housing 650. Also, the power transmission device 100 including the power generator 200, the front driver module 310 and the rear driver module 350 is interposed between the electric motor 500 and the expander housing 650. The air passage is connected such that external air flows into the air inlet of the expander housing 650 and then flows out of the air outlet through the scroll and the nozzle of the expander housing 650 and the expander 610.

The power generator 200 of the power transmission device 100 is mounted with the expander 610 on a shaft 221 of a bearing module 220, and is mounted with the rear driver module 350 and the expander housing 650 spaced apart from the rear rotor 250 by a predetermined gap in an axial direction of a frame 210 and disposed in a direction orthogonal to the rear rotor 250 at the rear side of the frame 210. The front side of the frame 210 is mounted on the electric motor 500, and the front driver module 310 is spaced from the front rotor 240 by a predetermined gap in the axial direction of the frame 210, disposed in a direction orthogonal to the front rotor 240 at the front side of the frame 210, and mounted on a shaft 520 of the electric motor 500 to receive the rotation power of the electric motor 500. A space-securing adapter 900 may be mounted between the power generator 200 and the electric motor 500.

The front driver module 310 is disposed such that the direction of the magnetic flux thereof is orthogonal to that of the front rotor 240 of the power generator 200.

That is, the permanent magnets 246 of the front rotor 240 are arranged in the axial diameter direction with a predetermined gap in the axial direction of the bearing module 220 and are arranged in an orthogonal direction such that the magnetic flux direction faces the axial direction of the bearing module 220. Thus, 2n (n is an integer of 2 or more) permanent magnets 246 are embedded in the rotating plate 242 such that N pole and S pole are alternately disposed.

The permanent magnets 316 of the front driver module 310 are spaced from the permanent magnets 246 of the front rotor 240 at a predetermined gap in the axial direction of the bearing module 220, and are disposed in the axial diameter direction of the bearing module 220 around the permanent magnets 246 of the front rotor 240 such that the magnetic flux direction faces the axial diameter direction of the bearing module 220. Thus, 2n (n is an integer of 4 or more) permanent magnets 316 are embedded in the fixing body 312 such that N pole and S pole are alternately disposed, or 3n (n is an integer of 2 or more) permanent magnets 316 are embedded in three-phase.

The case where the permanent magnets 246 of the front rotor 240 are arranged in the axial diameter direction with a predetermined gap in the axial direction of the bearing module 220 and are arranged in an orthogonal direction such that the magnetic flux direction faces the axial direction of the bearing module 220, 2n (n is an integer of 2 or more) permanent magnets 246 are embedded in the rotating plate 242 such that N pole and S pole are alternately disposed, the permanent magnets 316 of the front driver module 310 are disposed in the axial diameter direction of the bearing module 220 and the magnetic flux direction faces the axial diameter direction of the bearing module 220 such that N poles and S poles of 2n (n is an integer of 4 or more) permanent magnets are alternately disposed will be described as follows.

As shown in FIG. 8, four permanent magnets 246 are embedded in the rotating plate 242 of the front rotator 240 such that N pole and S pole are alternately disposed, and eight permanent magnets 316 are embedded in the fixing body 312 of the front driver module 310 such that N pole and S pole are alternately disposed. When the shaft 520 is in a stationary state, N pole permanent magnets 246 of the front rotor 240 are positioned between the N poles and the S poles of the permanent magnets 316 of the front driver module 310, or are in equilibrium of the magnetic field at positions facing the S poles. The S pole permanent magnets 246 of the front rotor 240 are positioned between the N pole and the S pole permanent magnet 316 of the front driver module 310, or are in equilibrium of the magnetic field at positions facing the S poles.

When the shaft 520 is rotated, the permanent magnets 316 of the front driver module 310 mounted on the shaft 520 are rotated, and form a rotational force of the rotating magnetic field of an attractive force and a repulsive force in a phase of 90 degrees with the permanent magnets 246 of the front rotor 240, thereby accelerating and rotating the front rotor 240.

Accordingly, the front driver module 310 receiving the rotation power of the shaft 520 rotates about a virtual magnetic rotation moment axis in which N pole and S pole of the permanent magnets 316 are alternately disposed in the axial diameter direction of the shaft 520. The front rotor 240 forms a virtual magnetic rotation moment axis in which N pole and S pole of the permanent magnets 246 are alternately disposed in the axial direction of the bearing module 220, and the rotating magnetic field formed by the rotation of the front drive module 310 forms a rotational force of a planetary motion with an interaction of an attractive force and a repulsive force with the rotating magnetic field formed by the rotation of the front rotor 240, thereby accelerating and rotating the front rotor 240.

The case where the permanent magnets 246 of the front rotor 240 are arranged in the axial diameter direction with a predetermined gap in the axial direction of the bearing module 220 and are arranged in an orthogonal direction such that the magnetic flux direction faces the axial direction of the bearing module 220, 2n (n is an integer of 2 or more) permanent magnets 246 are embedded in the rotating plate 242 such that N pole and S pole are alternately disposed, the permanent magnets 316 of the front driver module 310 are disposed in the axial diameter direction of the bearing module 220 and the magnetic flux direction faces the axial diameter direction of the bearing module 220 such that 3n (n is an integer of 2 or more) permanent magnets are alternately embedded in three-phase will be described as follows.

Four permanent magnets 246 are embedded in the rotating plate 242 of the front rotator 240 such that N pole and S pole are alternately disposed, and six permanent magnets 316 are embedded in the fixing body 312 of the front driver module 310 such that N, N, N poles and S, S, S poles are disposed in three-phase. When the shaft 520 is in a stationary state, N pole permanent magnets 246 of the front rotor 240 are positioned between the N pole and the S pole or the S pole and N pole of the permanent magnets 316 of the front driver module 310, or are in equilibrium of the magnetic field at positions facing the S pole and the N pole. The S pole permanent magnets 246 face the S pole and the N pole of the permanents 316 of the front driver module 310, or are positioned between the S pole and the S pole or the N pole and the N pole to be in equilibrium of the magnetic field.

When the shaft 520 is rotated, the permanent magnets 316 of the front driver module 310 mounted on the shaft 520 are rotated, and form a rotational force of the rotating magnetic field of an attractive force and a repulsive force at a phase of 120 degrees with the permanent magnets 246 of the front rotor 240, thereby accelerating and rotating the front rotor 240.

Accordingly, the front driver module 310 receiving the rotation power of the shaft 520 rotates about a virtual magnetic rotation moment axis in which N, N, N poles and S, S, S poles of the permanent magnets 316 are disposed in three-phase in the axial diameter direction of the shaft 520. The front rotor 240 forms the virtual magnetic rotation moment axis in which N pole and S pole are alternately disposed in the axial direction of the bearing module 220, and the rotating magnetic field formed by the rotation of the front drive module 310 forms a rotational force of a planetary motion due to an interaction of the attractive force and the repulsive force of the rotating magnetic field formed by the rotation of the front rotor 240, thereby accelerating and rotating the front rotor 240.

For example, as shown in FIG. 9, when a ring gear 820 is rotated in the planetary gear train, a planetary gear 830 of a planetary gear carrier 840 may accelerate and rotate a sun gear 810 while facing and uniformly pushing the sun gear 810, which is described as a driving example of a planetary motion type. The present invention is characterized in that the front rotor 240 of the power generator 200 faces the front driver module 310, and the magnetic flux of the permanent magnets 246 of the front rotor 240 faces the axial direction of the shaft 221, and the magnetic flux of the permanent magnets 316 of the front driver module 310 faces the axial diameter direction of the shaft 221 such that the rotating magnetic field of the front driver module 310 and the rotating magnetic field of the front rotor 240 accelerates and rotates the front rotor 240 with an interaction of the attractive force and the repulsive force in a form of planetary motion.

The front rotor 240 of the power generator 200 is disposed such that the direction of the magnetic flux thereof is orthogonal to that of the driver module 230 of the power generator 200. The rear rotator 250 of the power generator 200 is disposed such that the direction of the magnetic flux thereof is orthogonal to those of the rear driver module 350 and the driver module 230 of the power generator 200.

That is, the permanent magnets 246 of the front rotor 240 and the rear rotor 250 are arranged in the axial diameter direction with a predetermined gap in the axial direction of the bearing module 220 and are arranged in an orthogonal direction such that the magnetic flux direction faces the axial direction of the bearing module 220. Thus, 2n (n is an integer of 2 or more) permanent magnets 246 are embedded in the rotating plate 242 such that N pole and S pole are alternately disposed. The permanent magnets 236 of the driver module 230 are spaced from the permanent magnets 246 of the front rotor 240 and the permanent magnets 246 of the rear rotor 250 at a predetermined gap in the axial direction of the bearing module 220, and are disposed in the axial diameter direction of the bearing module 220 around the permanent magnets 246 of the front rotor 240 and the permanent magnets 246 of the rear rotor 250 such that the magnetic flux direction faces the axial diameter direction of the bearing module 220. Thus, 2n (n is an integer of 4 or more) permanent magnets 316 are embedded in the frame 210 such that N pole and S pole are alternately disposed, or 3n (n is an integer of 2 or more) permanent magnets 316 are embedded in three-phase.

The permanent magnets 316 of the rear driver module 310 are spaced from the permanent magnets 246 of the rear rotor 250 at a predetermined gap in the axial direction of the bearing module 220, and are disposed in the axial diameter direction of the bearing module 220 around the permanent magnets 246 of the rear rotor 250 such that the magnetic flux direction faces the axial diameter direction of the bearing module 220. Thus, 2n (n is an integer of 4 or more) permanent magnets 316 are embedded in the fixing body 312 such that N pole and S pole are alternately disposed, or 3n (n is an integer of 2 or more) permanent magnets 316 are embedded in three-phase.

The case where the permanent magnets 246 of the front rotor 240 are arranged in the axial diameter direction with a predetermined gap in the axial direction of the bearing module 220 and are arranged in an orthogonal direction such that the magnetic flux direction faces the axial direction of the bearing module 220, 2n (n is an integer of 2 or more) permanent magnets 246 are embedded in the rotating plate 242 such that N pole and S pole are alternately disposed, and the permanent magnets 236 of the driver module 230 are disposed in the axial diameter direction of the bearing module 220 with the permanent magnets 246 of the front rotor 240 and the permanent magnets 246 of the rear rotor 250 such that the magnetic flux direction faces the axial diameter direction of the bearing module 220 and N poles and S poles of 2n (n is an integer of 4 or more) permanent magnets are alternately disposed will be described as follows.

As shown in FIG. 10, four permanent magnets 246 are embedded in the rotating plate 242 of the front rotor 240 such that N pole and S pole are alternately disposed, and eight permanent magnets 236 of the driver module 230 are embedded in the permanent magnets-embedded holes of the frame 210 such that N pole and S pole are alternately disposed. When the front driver module 310 is in a stationary state, N pole permanent magnets 246 of the front rotor 240 are positioned between the N poles and the S poles of the permanent magnets 236 of the driver module 230, or are in equilibrium of the magnetic field at positions facing the S poles. The S pole permanent magnets 246 of the front rotor 240 are positioned between the N pole and the S pole of the permanent magnet 236 of the driver module 230, or are in equilibrium of the magnetic field at positions facing the S poles.

When the front rotor 240 is rotated by a rotating magnetic field and is accelerated and moved in the direction of the arrow by the rotational force of the rotating magnetic field generated by rotation of the front driving module 310, the permanent magnets 246 of the front rotor 240 obtain a driving force of magnetic field of an attractive force and a repulsive force in a phase of 90 degrees with the permanent magnets 236 of the driver module 230 to be accelerated while simultaneously moving in the direction of the arrow.

Accordingly, the front rotor 240 receiving the rotation power of the front driver module 310 rotates about a virtual magnetic rotation moment axis in which N pole and S pole of the permanent magnets 246 are alternately disposed in the axial direction of bearing module 220. The driver module 230 forms a magnetic field in which N pole and S pole of the permanent magnets 236 are alternately disposed in the axial diameter direction of the bearing module 220, and the rotating magnetic field formed by the rotation of the front rotor 240 forms a rotational force with an interaction of an attractive force and a repulsive force with the rotating magnetic field formed around the front rotor 240, thereby accelerating and rotating the front rotor 240. The interaction between the rear rotor 250 and the driver module 230 and the interaction between the rear rotor 250 and the rear driver module 350 may be equally described.

The case where the permanent magnets 246 of the front rotor 240 are arranged in the axial diameter direction with a predetermined gap in the axial direction of the bearing module 220 and are arranged in an orthogonal direction such that the magnetic flux direction faces the axial direction of the bearing module 220, 2n (n is an integer of 2 or more) permanent magnets 246 are embedded in the rotating plate 242 such that N pole and S pole are alternately disposed, and the permanent magnets 236 of the driver module 230 are disposed in the axial diameter direction of the bearing module 220 with the permanent magnets 246 of the front rotor 240 and the permanent magnets 246 of the rear rotor 250 such that the magnetic flux direction faces the axial diameter direction of the bearing module 220 and 3n (n is an integer of 2 or more) permanent magnets are disposed in three-phase will be described as follows.

As shown in FIG. 10, four permanent magnets 246 are embedded in the rotating plate 242 of the front rotor 240 such that N pole and S pole are alternately disposed, and six permanent magnets 236 of the driver module 230 are embedded in the permanent magnets-embedded holes of the frame 210 such that N, N, N poles and S, S, S poles are disposed in three-phase. When the front driver module 310 is in a stationary state, N pole permanent magnets 246 of the front rotor 240 are positioned between the N pole and the S pole or the S pole and the N pole of the permanent magnets 236 of the driver module 230, or are in equilibrium of the magnetic field at positions facing the S pole and the N pole. The S pole permanent magnets 246 face the S pole and the N pole of the permanent magnet 236 of the driver module 230, or are positioned between the S pole and the S pole or the N pole and N pole to be in equilibrium of the magnetic field.

When the front rotor 240 is rotated by a rotating magnetic field and is accelerated and moved in the direction of the arrow by the rotational force of the rotating magnetic field generated by rotation of the front driving module 310, the permanent magnets 246 of the front rotor 240 obtain a driving force of an attractive force and a repulsive force in a phase of 120 degrees with the permanent magnets 236 of the driver module 230 to be accelerated while simultaneously moving in the direction of the arrow.

Accordingly, the front rotor 240 receiving the rotation power of the front driver module 310 rotates about a virtual magnetic rotation moment axis in which N pole and S pole of the permanent magnets 246 are alternately disposed in the axial direction of bearing module 220. The driver module 230 forms a magnetic field in which N, N, N poles and S, S, S poles are disposed in three-phase in the axial diameter direction of the bearing module 220, and the rotating magnetic field formed by the rotation of the front rotor 240 forms a rotational force with an interaction of an attractive force and a repulsive force with the rotating magnetic field formed around the front rotor 240, thereby accelerating and rotating the front rotor 240. The interaction between the rear rotor 250 and the driver module 230 and the interaction between the rear rotor 250 and the rear driver module 350 may be equally described.

For example, when a wheel is driven by a prime mover in a magnetic levitation train and a vehicle body is accelerated above a certain speed, the interaction of a magnetic field traveling using an electromagnetic force between reaction plates installed at a uniform interval facing an armature installed on the vehicle body may be described as an example. The present invention is characterized in that the front rotor 240 and the rear rotor 250 of the power generator 200 face the driver module 230 and the rear driver module 350, the magnetic fluxes of the permanent magnets 246 of the front rotor 240 and the rear rotor 250 face the axial direction of the shaft 221, the magnetic fluxes of the permanent magnets 236 and 316 of the driver module 230 and the rear driver module 350 face the axial diameter direction, and thus the rotating magnetic field of the front rotor 240 and the rear rotor 250 and the magnetic field of the driver module 230 accelerate and rotate the front rotor 240 and the rear rotor 250 with an interaction of an attractive force and a repulsive force.

In the air cooling apparatus 010 configured as above, with rotation power supplied from the electric motor, the front rotor 240 and the rear rotor 250 of the power generator 200 face the front driver module 310 and the rear driver module 350, and the magnetic fluxes of the permanent magnets 246 of the front rotator 240 and the rear rotor 250 face the axial direction of the shaft 221. Also, the magnetic fluxes of the permanent magnets 316 of the front driver module 310 and the rear driver module 350 face the axial diameter direction of the shaft 221. Thus, the rotating magnetic field formed around the front rotor 240 while the front driver module 310 mounted on the shaft 520 of the electric motor 500 rotates and the rotating magnetic field of the front rotor 240 form a rotational force with an interaction of the attractive force and the repulsive force such that the front rotor 240 is accelerated and rotated and thus the power generator 200 is driven by the magnetic field.

In the power generator 200, the front rotors 240 and the rear rotors 250 face the driver modules 230 by the rotation of the front rotors 240, and the magnetic fluxes of the permanent magnets 246 of the front rotor 240 and the rear rotor 250 face the axial direction of the shaft 221. Also, the magnetic fluxes of the permanent magnets 236 of the driver modules 230 face the axial diameter direction of the shaft 221, and thus the rotating magnetic field formed while the front rotor 240 and the rear rotor 250 rotate and the magnetic field formed around the front rotor 240 and the rear rotor 250 by the driver module 230 form a rotational force with an interaction of the attractive force and the repulsive force. Thus, the power generator 200 enables accelerated rotation and increase the revolution per minute and the rotational force.

Also, the rear rotor 250 faces the rear driver module 350, and the magnetic flux faces of the permanent magnets 246 of the rear rotor 250 face the axial direction of the shaft 221. Also, the magnetic fluxes of the permanent magnets 316 of the motor modules 350 face the axial diameter direction of the shaft 221, and thus the rotating magnetic field of the rear rotor 250 of the power generator 250 and the magnetic field of the rear driver module 350 formed around the rear rotor 250 form a rotational force with an the interaction of the attractive force and the repulsive force, thereby increasing the revolution per minute and the rotational force.

Accordingly, with rotation power supplied from the electric motor, the front rotor 240 and the rear rotor 250 of the power generator 200 face the front driver module 310 and the rear driver module 350, and the magnetic fluxes of the permanent magnets 246 of the front rotator 240 and the rear rotor 250 face the axial direction of the shaft 221. Also, the magnetic fluxes of the permanent magnets 316 of the front driver module 310 and the rear driver module 350 face the axial diameter direction of the shaft 221. Thus, the rotating magnetic field formed while the front driver module 310 rotates, the rotating magnetic field formed by the power generator 200, the rotating magnetic field formed by the rear driver module 350 form a rotational force with an interaction of the attractive force and the repulsive force, thereby increasing the revolution per minute and the rotational force to transmit power. Thus, in the air cooling apparatus, the flow rate is increased, and air is adiabatically expanded to supply cold air of high air density.

The power transmission device 100 has the same effect even when the magnetic fluxes of the permanent magnets 246 of the front rotator 240 and the rear rotor 250 of the power generator 200 face the axial direction of the shaft 221, and the magnetic fluxes of the permanent magnet magnets 236 and 316 of the driver module 230 of the power generator 200, the front driver module 310 and the rear driver module 350 face the axial direction of the shaft 221.

The rotational force of the power transmission device 100 is determined by adjusting the magnetic density of the permanent magnets, the contact area of the magnetic field, the mounting diameter pitch of the permanent magnets and a gap of the permanent magnets facing each other in the orthogonal direction.

In addition, since the power transmission device 100 is driven by forming a rotational force of the magnetic field with an interaction of attractive force and repulsive force of the permanent magnets, due to high driving efficiency, noise is little generated, durability is good, and driving cost is low.

Figure 11:
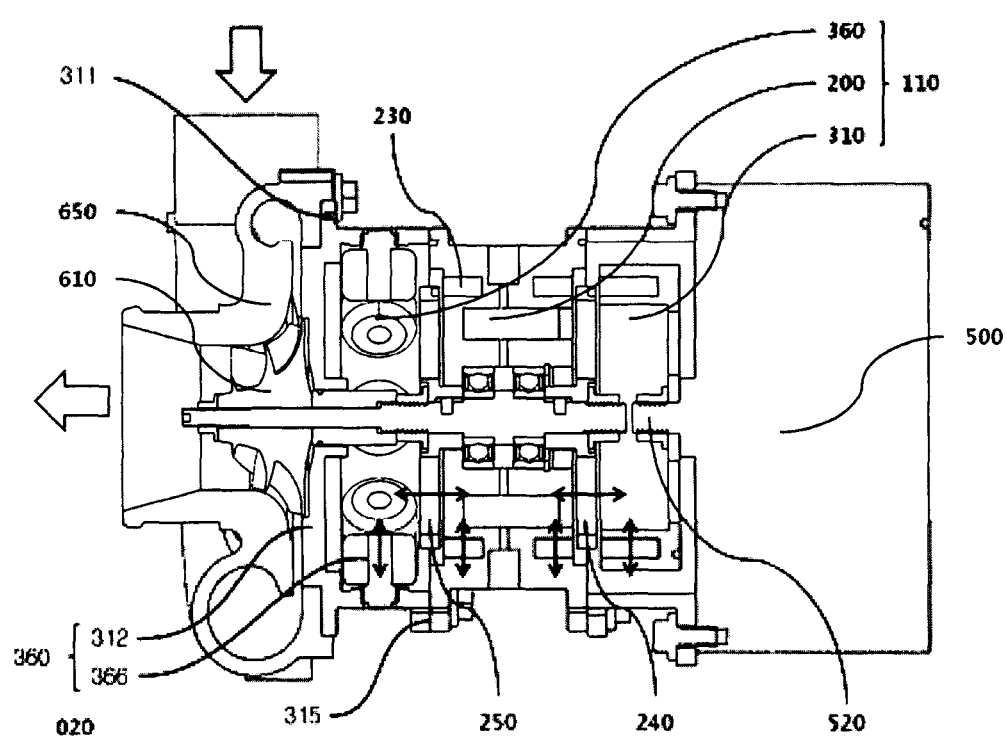
FIG. 11 is a cross-sectional perspective view illustrating an air cooling apparatus according to a second embodiment of the present invention.

The second embodiment will be described. FIG. 11 is a cross-sectional perspective view illustrating an air cooling apparatus according 020 to a second embodiment of the present invention, and FIGS. 8 to 10 are views illustrating operations of a power transmission device 110 according to an embodiment of the present invention. First, the components will be described. The air cooling apparatus 020 according to the second embodiment of the present invention includes an electric motor 500, an expander 610 rotating by the rotation of the electric motor 500 to expand air, and an expander housing 650 surrounding the expander 610, and a power transmission device 110 interposed between the electric motor 500 and the expander housing 650 to transmit the rotation power from the electric motor 500 to the expander 610

The power transmission device 110 includes a rear driver module 360, which is the rear driver module 350 of the power transmission device 100 of the first embodiment, including stators 366 of coil assembly wound with a coil forming a magnetic flux in a direction orthogonal to the magnetic flux direction of the permanent magnets 246 of the rear rotor 250. The power generator 200 is mounted with the expander 610 on a shaft 221 of a bearing module 220, and is mounted with the rear driver module 360 and the expander housing 650 spaced apart from the rear rotor 250 by a predetermined gap in an axial direction of a frame 210 and disposed in a direction orthogonal to the rear rotor 250 at the rear side of the frame 210. The front side of the frame 210 is mounted on the electric motor 500, and the front driver module 310 is spaced from the front rotor 240 by a predetermined gap in the axial direction of the frame 210, disposed in a direction orthogonal to the front rotor 240 at the front side of the frame 210, and mounted on a shaft 520 of the electric motor 500.

That is, the power transmission device 110 is configured such that the rear driver module 350 mounted with the permanent magnets 316 in the power transmission device 100 of the first embodiment is changed into the rear driver module 360 mounted with the stators 366 of coil assembly wound with a coil forming the magnetic flux.

In the rear driver module 360, a fixing body 312 having a mounting surface with the expander housing 650 and the power generator 200 and a through hole formed at a cylindrical body with one side thereof closed and having stator-embedded holes 313 formed in the circumferential axial direction and circumferential axial diameter direction around the rear rotor 250 at a uniform interval in accordance with a reference point 311 is provided, and stators 366 whose magnetic flux direction faces the axial diameter direction of the shaft 221 are arranged such that N poles and S poles are alternately embedded in the permanent magnet-embedded holes 313 in accordance with the reference point 311 of the fixing body 312, or are arranged in three-phase.

Specifically, the rear driver module 360 includes a fixing body 312 having a mounting surface 315 with the expander housing 650 and the power generator 200 and a through hole formed at a cylindrical body with one side thereof closed and having 2n (n is an integer of 4 or more) or 3n (n is an integer of 2 or more) stator-embedded holes 313 formed in the circumferential axial direction and the circumferential axial diameter direction around the rear rotor 250 at a uniform interval in accordance with a reference point 311, and a stator 366 of a coil assembly wound around a coil former whose N poles and S poles are alternately embedded in 2n stator-embedded holes in accordance with the reference point of the fixing body 312 or embedded in 3n stator-embedded holes 313 in three-phase such that the direction of magnetic fluxes of 2n or 3n stators 366 faces the axial diameter direction of the shaft 221.

In the power transmission device 110, the magnetic fluxes of the permanent magnets 246 of the front rotor 240 and of the rear rotor 250 of the power generator 200 may face the axial diameter direction of the shaft 221, and the magnetic fluxes of the permanent magnets 236 and 316 of the front driver module 310 and the driver modules 230 of the power generator 200 and the magnetic fluxes of the stator 366 of the rear driver module 360 may face the axial direction of the shaft 221.

Hereinafter, the operation of the air cooling apparatus 020 will be described. The power generator 200 of the power transmission device 110 is mounted with the expander 610 on a shaft 221 of a bearing module 220, and is mounted with the expander housing 650 and the rear driver module 360 spaced apart from the rear rotor 250 by a predetermined gap in an axial direction of a frame 210, disposed in a direction orthogonal to the rear rotor 250, including a coil forming a magnetic flux at the rear side of the frame 210. The front side of the frame 210 is mounted on the electric motor 500, and the front driver module 310 is spaced from the front rotor 240 by a predetermined gap in the axial direction of the frame 210, disposed in a direction orthogonal to the front rotor 240 at the front side of the frame 210, and mounted on a shaft 520 of the electric motor 500 to receive external power and rotation power of the electric motor 500. A space-securing adapter may be mounted between the power generator 200 and the electric motor 500.

In the air cooling apparatus 020 configured as described above, the rotation power supplied from the electric motor 500 operates as described in the first embodiment. The rotating magnetic field formed while the front driver module 310 mounted on the shaft 520 of the electric motor 500 rotates, the rotating magnetic field formed by the power generator 200, the rotating magnetic field formed by the rear driver module 360 form a rotational force with an interaction of the attractive force and the repulsive force, thereby increasing the revolution per minute and the rotational force to transmit power, reducing the capacity of the electric motor, minimizing generated noise and heat and increasing the flow rate. Also, air is adiabatically expanded to supply cold air of high air density.

The power transmission device 110 has the same effect even when the magnetic fluxes of the permanent magnets 246 of the front rotor 240 and the rear rotor 250 of the power generator 200 face the axial direction of the shaft 221, and the magnetic fluxes of the permanent magnet magnets 236 and 316 of the driver module 230 of the power generator 200 and the front driver module 310 and the magnetic fluxes of the stators 366 of the rear driver module 360 face the axial direction of the shaft 221.

The rotational force of the power transmission device 110 is determined by adjusting the magnetic density of the permanent magnets, the contact area of the magnetic field, the mounting diameter pitch of the permanent magnets, a gap of the permanent magnets facing each other in the orthogonal direction, and the amount of current of the stators 366 of the rear driver module 360.

Figure 12:
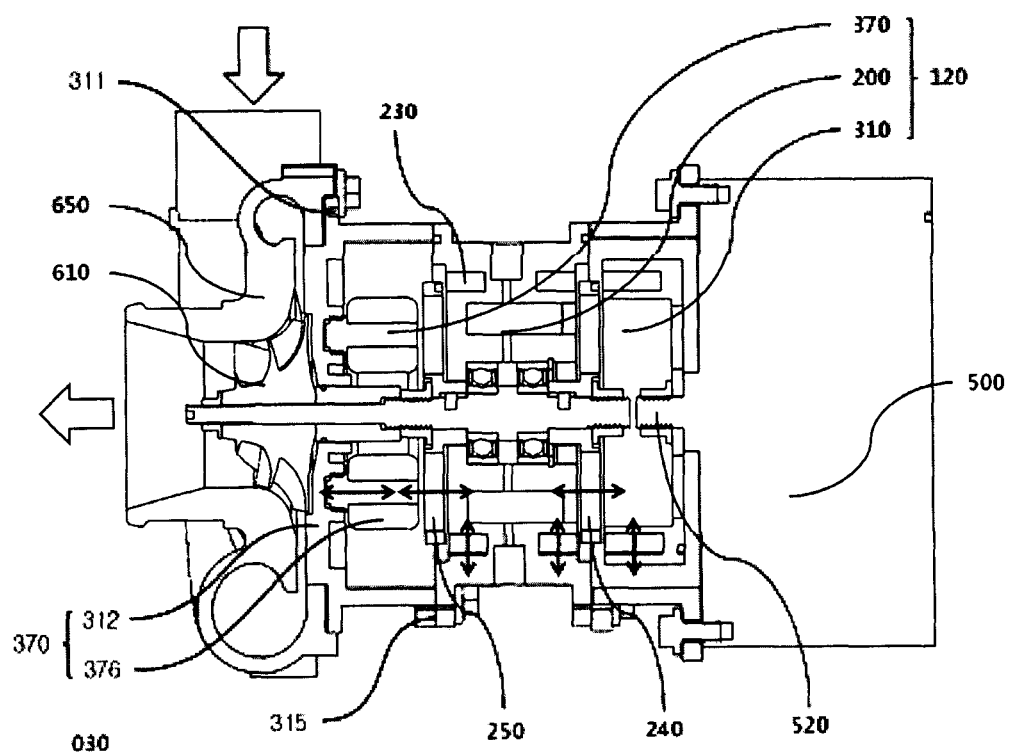
FIG. 12 is a cross-sectional perspective view illustrating an air cooling apparatus according to a third embodiment of the present invention.

The third embodiment will be described. FIG. 12 is a cross-sectional perspective view illustrating an air cooling apparatus 030 according to a third embodiment of the present invention, and FIGS. 8 to 10 are views illustrating operations of a power transmission device 120. First, the components will be described. The air cooling apparatus 030 according to the third embodiment of the present invention includes an electric motor 500, an expander 610 rotating by the rotation of the electric motor 500 to expand air, and an expander housing 650 surrounding the expander 610, and a power transmission device 120 interposed between the electric motor 500 and the expander housing 650 to transmit the rotation power from the electric motor 500 to the expander 610

The power transmission device 120 includes a rear driver module 370, which is the rear driver module 350 of the power transmission device 100 of the first embodiment, including armatures 376 of coil assembly wound with a coil forming a magnetic flux whose direction is the same as the permanent magnets of the rear rotor 250 on the same circumferential axial line. The power generator 200 is mounted with the expander 610 on a shaft 221 of a bearing module 220, and is mounted with the rear driver module 370 and the expander housing 650 spaced apart from the rear rotor 250 by a predetermined gap in an axial direction of a frame 210 and disposed in a direction orthogonal to the rear rotor 250 at the rear side of the frame 210. The front side of the frame 210 is mounted on the electric motor 500, and the front driver module 310 is spaced from the front rotor 240 by a predetermined gap in the axial direction of the frame 210, disposed in a direction orthogonal to the front rotor 240 at the front side of the frame 210, and mounted on a shaft 520 of the electric motor 500.

That is, the power transmission device 120 is configured such that the rear driver module 350 mounted with the permanent magnets 316 in the power transmission device 100 of the first embodiment is changed into the rear driver module 370 mounted with the armatures 376 of coil assembly wound with a coil in which power generation is performed.

In the rear driver module 370, a fixing body 312 having a mounting surface with the expander housing 650 and the power generator 200 and a through hole formed at a cylindrical body with one side thereof closed and having armature-embedded holes 313 formed in the same circumferential axial line as the permanent magnets 246 of the rear rotor 250 of the power generator 200 at a uniform interval in accordance with a reference point 311 is provided, and armatures 376 of coil assembly wound around a coil former whose magnetic flux direction faces the axial diameter direction of the shaft 221 are arranged and embedded in the armature-embedded holes 313 in three-phase in accordance with the reference point 311.

Specifically, the rear driver module 370 includes a fixing body having a mounting surface 315 with the expander housing 650 and the power generator 200 and a through hole formed at a cylindrical body with one side thereof closed and having 3n (n is an integer of 2 or more) armature-embedded holes 313 formed on the same circumferential axial line as the permanent magnets 246 of the rear rotor 250 of the power generator 200 at a uniform interval in accordance with a reference point 311, and an armature 376 of a coil assembly wound around a coil former and embedded in 3n armature-embedded holes 313 in three-phase in accordance with the reference point of the fixing body such that the direction of 3n magnetic fluxes faces the axial direction of the shaft.

Hereinafter, the operation of the air cooling apparatus 030 will be described. The power generator 200 of the power transmission device 120 is mounted with the expander 610 on a shaft 221 of a bearing module 220, and is mounted with the expander housing 650 and the rear driver module 360 spaced apart from the rear rotor 250 by a predetermined gap in an axial direction of a frame 210, disposed in a direction orthogonal to the rear rotor 250, including a coil in power generation is performed at the rear side of the frame 210. The front side of the frame 210 is mounted on the electric motor 500, and the front driver module 310 is spaced from the front rotor 240 by a predetermined gap in the axial direction of the frame 210, disposed in a direction orthogonal to the front rotor 240 at the front side of the frame 210, and mounted on a shaft 520 of the electric motor 500 to receive rotation power of the electric motor 500. A space-securing adapter may be mounted between the power generator 200 and the electric motor 500.

The rear driver module 370 includes armatures 376 disposed on the same circumferential axial line as the permanent magnets 246 of the rear rotor 250 with a predetermined gap while facing each other and disposed at a phase angle of 120 degrees. The armatures 376 intermit the magnetic flux with the rotating magnetic field of the rear rotor 250 to generate an induced electromotive force and produce three-phase alternating current power.

The air cooling apparatus 030 configured as described above operates as described in the first embodiment with the rotation power supplied from the motor 500. The rotating magnetic field generated while the front driver module 310 mounted on the shaft 520 of the electric motor 500 rotates and the rotating magnetic field generated by the power generator 200 generate a rotational force with an interaction of the attractive force and the repulsive force to increase the revolution per minute and the rotational force and transmit power. The rear rotor 250 transmits power of the rotating magnetic field to the rear driver module 370 and intermits the magnetic flux to produce electric power, thereby increasing the flow rate, adiabatically expanding air, supplying cold air of high air density, and reducing the operation cost by driving the electric motor 500 using the produced electric power.

It will be apparent that the present invention is not limited to the above-described embodiments and various modifications can be made without departing from the essential points of the present invention.

The present invention may be employed for industrial, commercial, automotive, household purposes as an air supply device for supplying cooling air by adiabatically expanding air, and in particular, may be used as a cooling device for an air conditioner.

What is claimed is:
1. An air cooling apparatus comprising:
an electric motor;
an expander rotating by rotation power of the electric motor to expand air;
an expander housing surrounding the expander; and
a power transmission device interposed between the electric motor and the expander housing to transmit the rotation power to the expander,
wherein the power transmission device comprises a power generator; and a front driver module and a rear driver module disposed at a front and a rear side of the power generator to form magnetic fields around a front rotor and a rear rotor of the power generator, the power generator being mounted with the expander on a shaft of a bearing module, the power generator being mounted with the rear driver module and the expander housing spaced apart from the rear rotor by a predetermined rear gap in an axial direction of a frame, a width of the rear gap disposed in a direction orthogonal to the rear rotor, and the power generator being disposed in a direction orthogonal to the rear rotor at a rear side of the frame, a front side of the frame being mounted on the electric motor, and the front driver module being spaced from the front rotor by a predetermined front gap in the axial direction of the frame, a width of the front gap disposed in a direction orthogonal to the front rotor, and the front driver module being disposed in a direction orthogonal to the front rotor at the front side of the frame and being mounted on a shaft of the electric motor to receive the rotation power of the electric motor, and
the front rotor and the rear rotor of the power generator face the front driver module and the rear driver module, permanent magnets included in the front rotor and the rear rotor generating magnetic fluxes, and permanent magnets included in the front driver module and the rear driver module generating magnetic fluxes such that a rotating magnetic field generated by rotation of the front driver module, a rotating magnetic field generated by the power generator and a magnetic field of the rear driver module form a rotational force with the interaction of an attractive force and a repulsive force to transfer the rotation power of the motor to the expander,
wherein the power generator comprises:
the frame;
the bearing module mounted on the frame;
the front rotor and the rear rotor disposed in a direction orthogonal to a front and a rear face of the frame, and spaced from the front and rear faces in an axial direction by a predetermined gap, the front and rear rotors being fixed to the shaft of the bearing module, allowing the permanent magnets of the front and rear rotors to be arranged in an axial diameter direction while being spaced by the predetermined gap in an axial direction of the shaft of the bearing module and disposed in an orthogonal direction of the frame;

a driver module spaced from the front rotor and the rear rotor by the predetermined gap in an axial direction of the shaft of the bearing module and disposed in an orthogonal direction such that permanent magnets included in the driver module are arranged around the front rotor and the rear rotor in an axial diameter direction, and mounted onto the frame;

lock nuts for fixing the front rotor and the rear rotor to the bearing module; and a fixture for fixing the bearing module to the frame.

2. The apparatus of claim 1, wherein the frame has 2n (n is an integer of 4 or more) or 3n (n is an integer) permanent magnet-embedded holes formed in an inner surface of the front and the rear side of the frame in the circumferential axial direction around the front rotor and the rear rotor at a uniform interval based on a reference point centering on an axis of a body formed in a cylindrical shape having a mounting space; the bearing module formed of any one of a grease lubrication bearing, an oil lubrication bearing, an air cooling bearing and a magnetic bearing formed in an inner circumferential surface of the frame; and the body having mounting surfaces of the electric motor, the expander housing and the rear driver module formed at a front surface and a rear surface of the body.

3. The apparatus of claim 1, wherein the bearing module comprises:

a shaft having a bearing mounting surface, a bearing fixing step, and fixing grooves and threads for fixing the phases of the front and rear rotors formed on a circumferential surface of a body having a round rod shape;

any one of a grease lubrication bearing, and oil lubrication bearing, an air cooling bearing and a magnetic bearing; and the fixture for fixing the phases of the front rotor and the rear rotor.

4. The apparatus of claim 1, wherein the front rotor and the rear rotor comprises:

a rotating plate comprising a cylindrical protrusion formed at a center of a body having a disc shape, having a slot groove formed in the inner circumferential surface to fix the phase, and having 2n (hereinafter, n is an integer) permanent magnet-embedded holes formed on a circumferential axis line of the body at a uniform interval in accordance with the slot groove; and 2n permanent magnets whose N poles and S poles are alternately embedded in the permanent magnet-embedded holes in accordance with the slot groove of the rotating plate such that the direction of the magnetic fluxes of 2n permanent magnets faces the axial direction of the shaft.

5. The apparatus of claim 1, wherein the driver module comprises 2n (n is an integer) permanent magnets whose N poles and S poles are alternately embedded in permanent magnet-embedded holes of the frame in accordance with a reference point of the frame or 3n (n is an integer) permanent magnets arranged in three-phase such that the direction of the magnetic fluxes of permanent magnets faces the axial diameter direction of the shaft.

6. The apparatus of claim 1, wherein the front driver module comprises:

a fixing body having a shaft through hole and a mounting surface of the electric motor formed at the center of a cylindrical body and having 2n (n is an integer) or 3n (n is an integer) permanent magnet-embedded holes formed in the circumferential axial direction around the front rotor at a uniform interval in accordance with a reference point; and 2n permanent magnets whose N poles and S poles are alternately embedded in the permanent magnet-embedded holes in accordance with the reference point of the fixing body or 3n permanent magnets arranged in three-phase such that the direction of the magnetic fluxes of 2n or 3n permanent magnets faces the axial diameter direction of the shaft.

7. The apparatus of claim 1, wherein the rear driver module comprises:

a fixing body having a mounting surface with the expander housing and the power generator and a through hole formed in a cylindrical body and having 2n (n is an integer) or 3n (n is an integer) permanent magnet-embedded holes formed in the circumferential axial direction around the rear rotor at a uniform interval in accordance with a reference point; and 2n permanent magnets whose N poles and S poles are alternately embedded in the permanent magnet-embedded holes in accordance with the reference point of the fixing body or 3n permanent magnets arranged in three-phase such that the direction of magnetic fluxes of 2n or 3n permanent magnets faces the axial diameter direction of the shaft.

8. The apparatus of claim 1, wherein in the power transmission device, the permanent magnets of the front rotor and the rear rotor of the power generator are arranged such that the direction of the magnetic flux extends along a first direction and the magnetic fluxes of the permanent magnets of the driver module, the front driver module and the rear driver module of the power generator extends along a second direction and wherein the first direction is perpendicular to the second direction.

\* \* \* \* \*